(12) United States Patent
Moessner

(10) Patent No.: US 8,371,274 B2
(45) Date of Patent: Feb. 12, 2013

(54) VEHICLE WITH AN INTERNAL COMBUSTION ENGINE FOR ETHANOL-CONTAINING FUELS, AND AN AUXILIARY HEATER

(75) Inventor: David Moessner, Lorch (DE)

(73) Assignee: Robert Bosch GmbH, Stuttgart (DE)

( * ) Notice: Subject to any disclaimer, the term of this patent is extended or adjusted under 35 U.S.C. 154(b) by 615 days.

(21) Appl. No.: 12/518,032

(22) PCT Filed: Nov. 30, 2007

(86) PCT No.: PCT/EP2007/063086
§ 371 (c)(1),
(2), (4) Date: Jun. 5, 2009

(87) PCT Pub. No.: WO2008/068203
PCT Pub. Date: Jun. 12, 2008

(65) Prior Publication Data
US 2011/0146633 A1    Jun. 23, 2011

(30) Foreign Application Priority Data
Dec. 6, 2006 (DE) .......................... 10 2006 057 434

(51) Int. Cl.
*B60H 1/22* (2006.01)
(52) U.S. Cl. ..................... 123/550; 123/556; 123/568.11
(58) Field of Classification Search .................. 123/550, 123/551, 556, 179.21, 557, 568.11; 251/327, 251/328, 368
See application file for complete search history.

(56) References Cited

U.S. PATENT DOCUMENTS

| | | | |
|---|---|---|---|
| 1,761,388 A | 6/1930 | Good | |
| 2,913,220 A * | 11/1959 | Cover | 251/328 |
| 3,630,183 A | 12/1971 | Hoffman | |
| 3,727,596 A * | 4/1973 | Panhard | 123/406.67 |
| 3,977,377 A * | 8/1976 | Reid | 123/550 |
| 4,002,025 A * | 1/1977 | Yamaguchi et al. | 60/274 |
| 4,030,464 A | 6/1977 | Yamaguchi et al. | |
| 4,541,453 A * | 9/1985 | Graf et al. | 137/315.31 |
| 5,377,440 A * | 1/1995 | Eller et al. | 431/11 |
| 5,735,501 A * | 4/1998 | Maurer et al. | 251/85 |
| 6,227,178 B1 * | 5/2001 | Suzuki | 123/556 |
| 6,293,241 B1 * | 9/2001 | Suzuki | 123/142.5 R |
| 6,571,779 B2 * | 6/2003 | Suzuki | 123/550 |

(Continued)

FOREIGN PATENT DOCUMENTS

| DE | 3146843 A1 | 6/1983 |
|---|---|---|
| DE | 3603379 A1 | 8/1986 |

(Continued)

*Primary Examiner* — Marguerite McMahon
(74) *Attorney, Agent, or Firm* — Maginot, Moore & Beck

(57) ABSTRACT

The present invention relates to a vehicle, having an internal combustion engine which is designed for combusting an ethanol-containing fuel, and an engine-independent air heating system. An exhaust passage of the engine-independent air heating system is disposed adjacent to a suction pipe of the internal combustion engine in order to heat the air in the suction pipe. Alternatively or additionally, the exhaust passage of the engine-independent air heating system is disposed adjacent to a fuel supply line of the internal combustion engine in order to heat the fuel in the fuel supply line. A connecting element or connecting openings are disposed between the exhaust passage of the engine-independent air heating system and the suction pipe in order to pass the exhaust gas of the engine-independent air heating system completely or partly into the suction pipe.

14 Claims, 3 Drawing Sheets

U.S. PATENT DOCUMENTS

| | | |
|---|---|---|
| 2002/0029771 A1 | 3/2002 | Suzuki |
| 2003/0168033 A1 | 9/2003 | Hunt et al. |
| 2004/0003790 A1 | 1/2004 | Hunt et al. |
| 2004/0173165 A1 | 9/2004 | Sieber et al. |

FOREIGN PATENT DOCUMENTS

| | | |
|---|---|---|
| DE | 3721834 A1 | 1/1989 |
| DE | 4109435 C1 | 5/1992 |
| DE | 4235075 A1 | 4/1994 |
| DE | 4411959 A1 | 10/1995 |
| DE | 19520122 A1 | 12/1996 |
| DE | 19925915 A1 | 12/1999 |
| DE | 10005520 A1 | 8/2000 |
| DE | 10306145 A1 | 8/2004 |
| DE | 102004028304 A1 | 1/2006 |

\* cited by examiner

II-II

VEHICLE WITH AN INTERNAL COMBUSTION ENGINE FOR ETHANOL-CONTAINING FUELS, AND AN AUXILIARY HEATER

CROSS-REFERENCE TO RELATED APPLICATION

This application is a 35 USC 371 application of PCT/EP 2007/063086 filed on Nov. 30, 2007.

BACKGROUND OF THE INVENTION

1. Field of the Invention

The present invention relates to a vehicle, including an internal combustion engine for an ethanol-containing fuel and including an auxiliary heater.

2. Description of the Prior Art

Internal combustion engines are known from the prior art in various embodiments. Most recently, ethanol has been increasingly recommended as an alternative fuel to conventional fuels. An ethanol-containing fuel is offered for instance by the name E85, which contains 85% ethanol and 15% gasoline. Since ethanol can be obtained from renewable resources, the expectation is that the sales of such ethanol-containing fuels will rise in the future. One problem with ethanol-containing fuels, however, is that they have poor cold-starting properties. These poor cold-starting properties are due to the relatively high temperature of evaporation of ethanol, at approximately 78° C. With the admixture of the gasoline, the cold-starting properties are fundamentally improved. However, problems arise at temperatures below 0° C.

To make it possible to start vehicles operated with ethanol at temperatures below 0° C., a separate supplementary heater must be provided.

From the prior art, auxiliary heaters are also known, which are typically operated with the fuel used by the engine. The heat furnished by the auxiliary heater is utilized for heating the coolant of the engine and/or the passenger compartment, via a heat exchanger.

ADVANTAGES AND SUMMARY OF THE INVENTION

The vehicle according to the invention has the advantage over the prior art that a supplementary heater for improving the cold-starting properties of an engine designed for combusting ethanol-containing fuel can be dispensed with.

According to the invention, the exhaust gas heat of the auxiliary heater is used for heating the combustion air and/or for heating the ethanol-containing fuel. As a result, an improved cold-starting property of an ethanol-containing fuel can be achieved, and it is also possible for the fuel to comprise 100% ethanol. This is achieved according to the invention by providing that an exhaust conduit of the auxiliary heater extends adjacent to an intake tube of the engine, in order to heat air located in the intake tube, and/or that the exhaust conduit of the auxiliary heater is disposed adjacent to a fuel supply line of the engine, in order to heat fuel located in the fuel supply line, and/or that exhaust gas from the auxiliary heater is delivered directly into the intake tube. For that purpose, in order to deliver all or some of the exhaust gas from the auxiliary heater to the intake tube, there is a connection element between the exhaust conduit of the auxiliary heater and the intake tube. As a result, the warm exhaust gas of the auxiliary heater is brought into the intake region of the engine, so that the temperature there rises. In the simplest case, the connection element is a short piece of pipe between the exhaust conduit of the auxiliary heater and the intake conduit, or openings therebetween communicating directly with one another.

Especially preferably, a valve, in particular a slide valve, is disposed in the connection element between the exhaust conduit and the intake tube. As a result, a quantity of the heated exhaust gas from the auxiliary heater, delivered into the intake conduit, can be controlled.

Also preferably, the vehicle includes a temperature sensor in the intake tube and a regulating device that regulates an injected fuel quantity into the engine as a function of the temperature in the intake tube. The injected fuel quantity is dimensioned such that at a relatively low temperature in the intake tube, only a lesser fuel quantity is injected, in order particularly upon starting of the vehicle to assure adequate evaporation of the ethanol component in the fuel. Since in particular each combustion stroke in the combustion chamber of the engine causes an increase in the combustion chamber wall temperature, a heat level at which the ethanol evaporates adequately can be reached relatively quickly.

In a further preferred feature of the invention, the exhaust conduit of the auxiliary heater discharges into an exhaust system of the engine. As a result, cleaning of the exhaust gas from the auxiliary heater by the engine cleaning systems is assured.

To assure the most compact possible construction inside the engine compartment, the exhaust conduit of the auxiliary heater is preferably disposed beneath the intake tube. It should be noted that it is also possible for the exhaust conduit of the auxiliary heater to be subdivided into two or more tubes of smaller diameter, which for heating larger areas are extended at various points along the intake conduit and/or the fuel supply line.

The auxiliary heater is preferably embodied as a water heater, which communicates directly with the cooling system of the engine. The cooling system then includes a blocking element, in order upon starting of the engine to disconnect the cooling system from the auxiliary heater. It can thereby be assured that upon starting of the engine, not all the waste heat from the auxiliary heater is carried into the cooling system of the engine; instead, it is used for heating the aspirated air or the ethanol-containing fuel.

Also preferably, the vehicle includes one or more access sensors, which detect an intent to enter the vehicle. If such an intent to enter is detected by the access sensors, it is forwarded to the regulating device, which then immediately actuates the auxiliary heater to enable heating of the aspirated air and/or of the fuel of the engine. As a result, by the time the driver is seated in the vehicle, no time is lost for heating; instead, the driver can start the vehicle immediately.

The internal combustion engine of the invention can combust both an ethanol-containing fuel, such as E85, or fuel that is 100% ethanol. The auxiliary heater is preferably operated with the same fuel that is used for the combustion in the engine. In the auxiliary heater, there may be a plurality of external ignition devices, in order to achieve adequate evaporation of the ethanol component in the fuel for the auxiliary heater faster.

BRIEF DESCRIPTION OF THE DRAWINGS

Exemplary embodiments of the invention are described in detail below in conjunction with the drawings, in which.

DESCRIPTION OF THE PREFERRED EMBODIMENTS

Below, in conjunction with FIGS. 1 through 3, a combination of an internal combustion engine with an auxiliary heater in a first exemplary embodiment of the invention will be described in detail.

Figure 1:
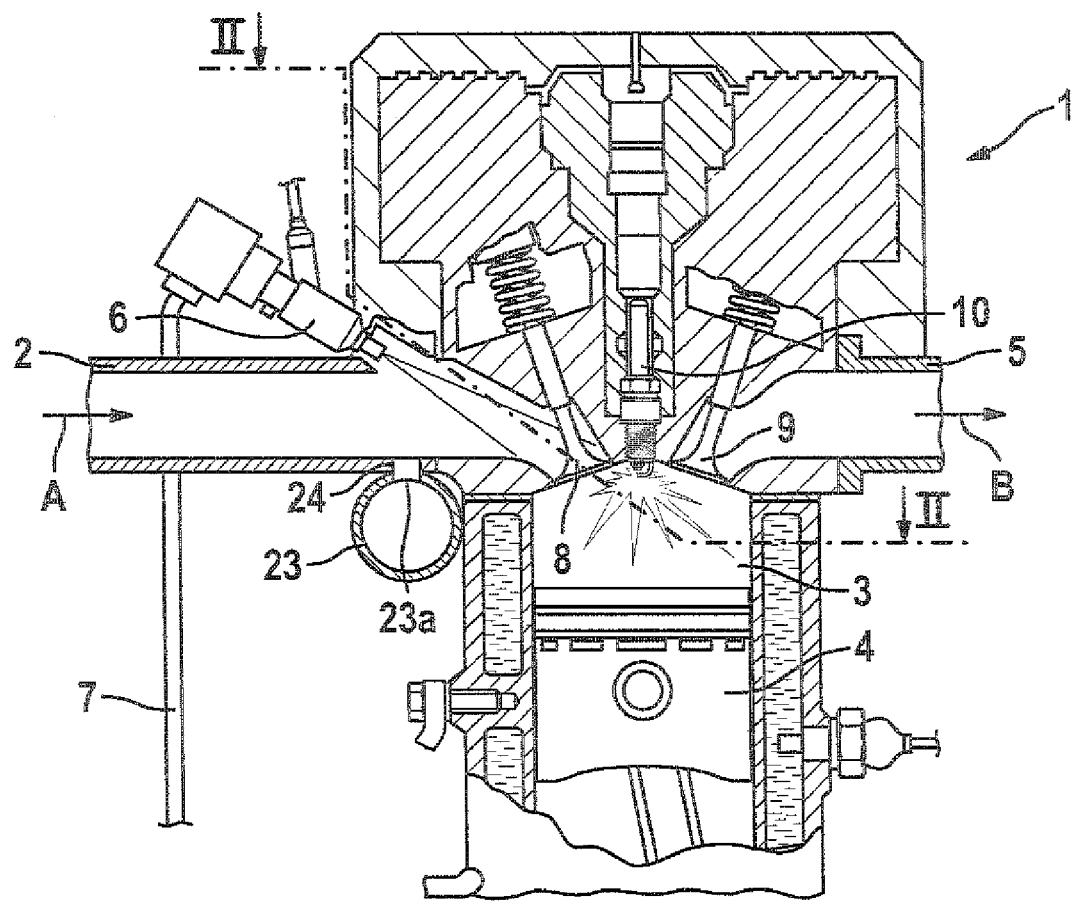
FIG. 1 is a schematic sectional view of an internal combustion engine in a first exemplary embodiment of the invention.

FIG. 1 is a schematic view of an internal combustion engine 1 in the first exemplary embodiment. The engine 1 is a gasoline engine and includes an intake tube 2, through which combustion air is delivered (arrow A) to a combustion chamber 3. A piston 4 is disposed in a known manner in the combustion chamber 3, and at the end of the intake tube 2, mixture formation takes place between a fuel that contains ethanol and the combustion air. For that purpose, an injector 6 is provided, which injects fuel, which is delivered by a fuel supply line 7 from a tank, into the intake tube 2. A connection between the end of the intake tube and the combustion chamber 3 is made and undone by means of an inlet valve 8, and a connection between the combustion chamber 3 and an outlet 5 is made and undone by means of an outlet valve 9. Reference numeral 10 identifies a spark plug. As indicated by the arrow B, exhaust gas from the engine is carried away.

As can be seen from. FIG. 1, an exhaust pipe 23 of an auxiliary heater 20 is disposed beneath the intake tube 2. The auxiliary heater 20 is not shown in detail. The auxiliary heater includes a combustion chamber and a burner which combusts fuel from the tank of the vehicle. The hot exhaust gases from the combustion chamber are carried away via the exhaust pipe 23. An opening 23a is embodied in the exhaust pipe 23 and communicates (see FIG. 1) with the intake tube 2 of the engine 1 via a connection element 24. As seen from FIG. 2, a slide 25 is provided as a valve member, which can furnish and interrupt the communication via the connection element 24 between the exhaust pipe 23 of the auxiliary heater 20 and the intake tube 2. The slide 25 has an opening 25a, which corresponds to the opening or the cross section of the tubular connection element 24, as is shown schematically in FIG. 3.

The slide 25 is connected to a regulating device, which as a function of a temperature in the intake tube 2, which can be ascertained by means of a temperature sensor, regulates an opening cross section between the exhaust pipe 23 of the auxiliary heater and the intake tube 2 of the engine. For instance, for starting the engine, the slide 25 can be moved into a position such that the entire cross section of the connection element 24 is opened up, in order to deliver a maximum quantity of exhaust gas from the auxiliary heater 20 into the intake tube 2 of the engine 1. In a multi-valve engine, the connection element 24 discharges upstream of an intake conduit 2a of an inlet valve 8. In FIG. 2, a second intake conduit 2b and a second inlet 8a are also shown. As a result, the temperature at the intake tube 2 rises significantly, so that an injection of an ethanol-containing fuel into the intake tube 2 can take place without causing the familiar cold-starting problems associated with the use of ethanol as fuel.

Figure 2:
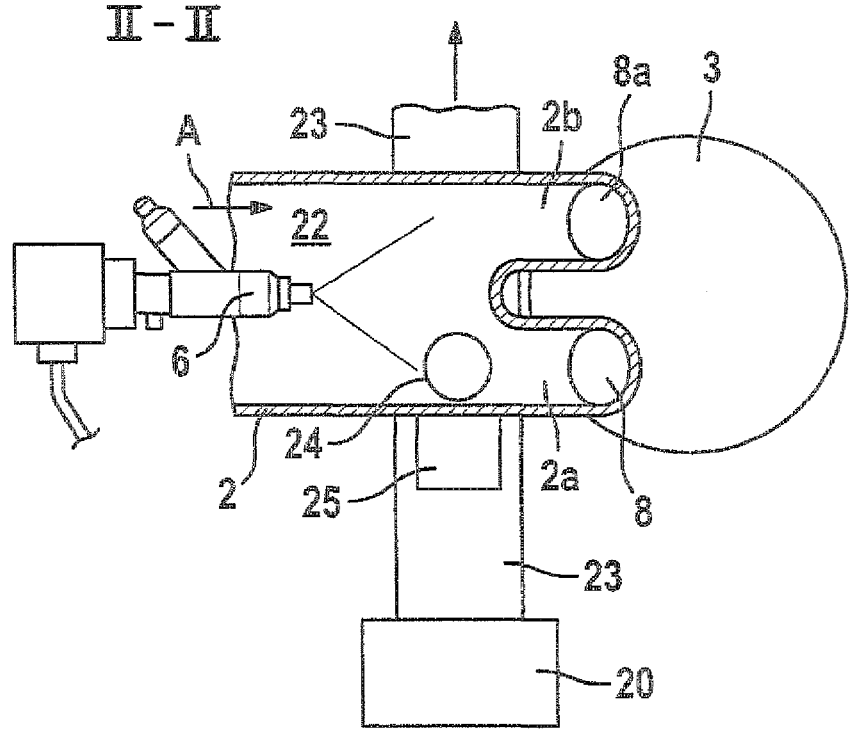
FIG. 2 is a schematic sectional view taken along the line in FIG. 1.
Figure 3:
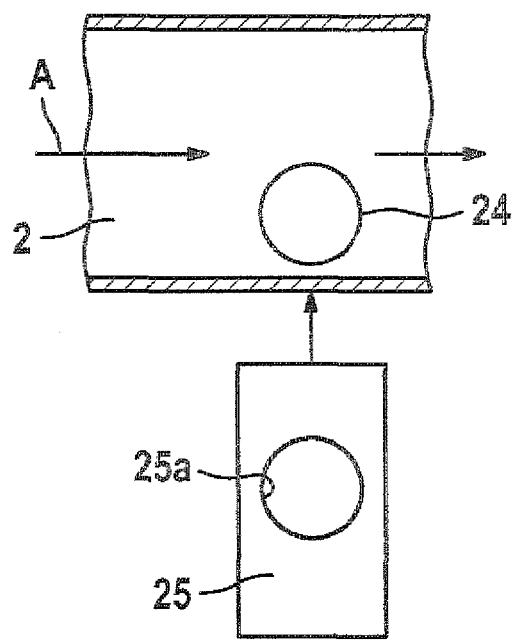
FIG. 3 is a schematic view of a connection between the auxiliary heater and the engine.

In addition, as can be seen from FIG. 2, the intake tube 2 is likewise heated by a heat transfer from the exhaust pipe 23 of the auxiliary heater. To attain the most complete possible combustion of the ethanol-containing fuel in the combustion chamber 3 of the engine 1, the full quantity of exhaust gas from the auxiliary heater 20 is therefore not delivered to the intake tube 2; instead, only some of it is delivered via the connection element 24. Thus according to the invention, by switching on the auxiliary heater 20 before the engine 1, adequate evaporation of the ethanol component in the fuel can be assured. Depending on the time interval between when the auxiliary heater is switched on and the engine is started, a certain temperature can be attained in the intake system of the engine 1. Depending on the temperature in the intake tube 2, the mass of ethanol that can be evaporated at the prevailing temperature can thus be determined. It is thus possible for the regulating device, at the onset of the starting process of the engine, not to inject the entire fuel quantity immediately but instead, depending on the temperature, to inject a quantity that assures that the ethanol component can be combusted completely. Since each combustion in the combustion chamber 3 of the engine causes an increase in the combustion chamber wall temperature, the next mixture formation in the intake tube can be improved still further.

It should also be noted that the method according to the invention of switching on the auxiliary heater 20 before the starting of the engine can be used at outdoor temperatures higher than 0° C. as well. By first activating the warm stream of exhaust gas from the auxiliary heater 20, the untreated emissions upon cold starting or restarting of the engine can be reduced faster because of the improved mixture preparation. Especially advantageously, the exhaust gases from the auxiliary heater are then also delivered to the exhaust system of the engine 1, for suitable posttreatment, for instance in a catalytic converter.

Figure 4:
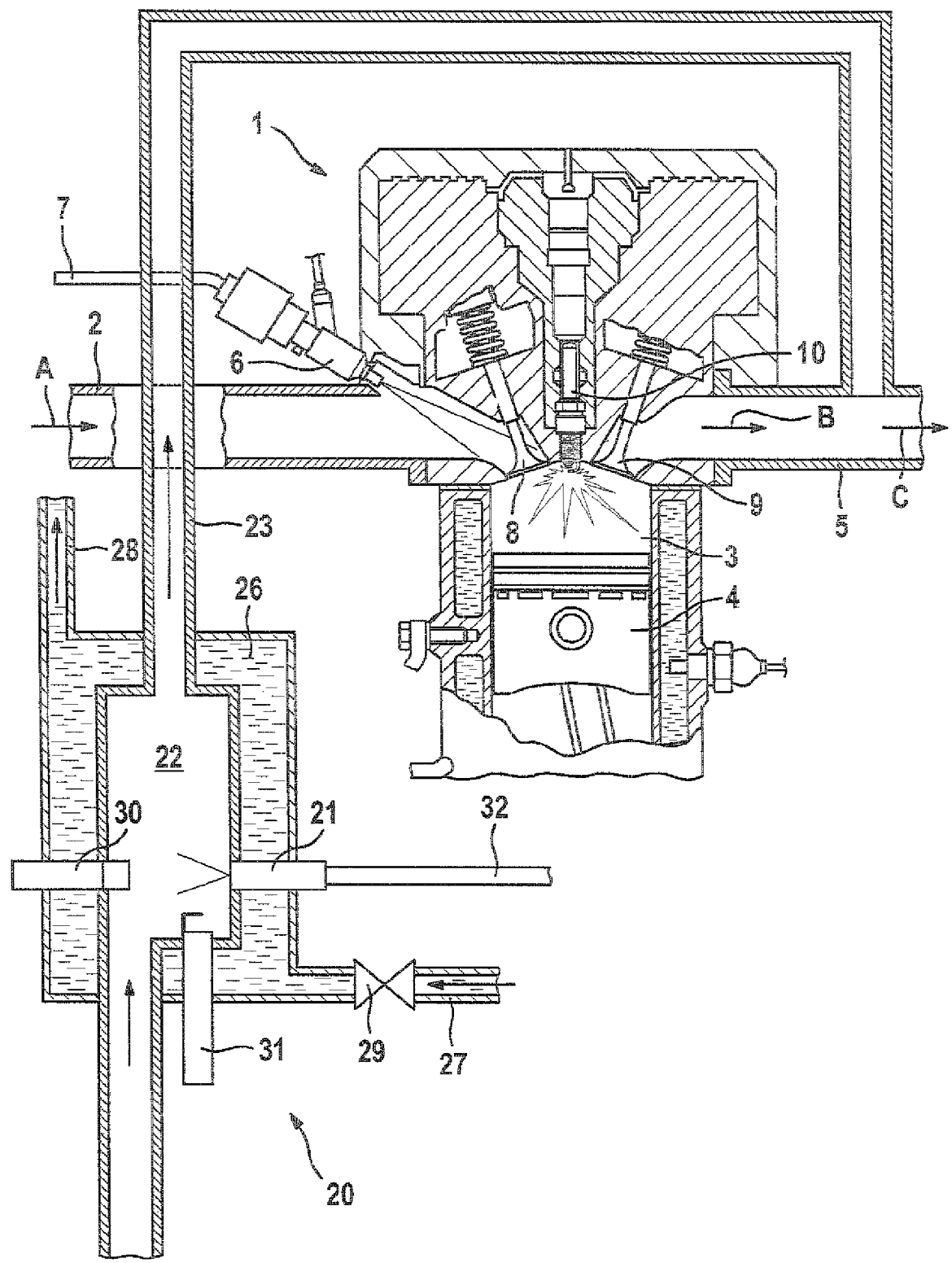
FIG. 4 is a schematic view of a combination of an internal combustion engine with an auxiliary heater, in a second exemplary embodiment of the invention.

FIG. 4 shows a combination of an internal combustion engine with an auxiliary heater in a second exemplary embodiment of the invention, in which identical or functionally identical parts are identified by the same reference numerals as in the first exemplary embodiment.

In a distinction from the first exemplary embodiment, in the second exemplary embodiment there is no direct communication of an exhaust pipe 23 of an auxiliary heater 20 with an intake tube 2 of the engine 1. The exhaust pipe 23 of the auxiliary heater 20 is merely extended directly past the intake tube 2 of the engine 1, so that a heat transfer between the hot exhaust pipe 23 and the cold intake tube 2 is made possible. Moreover, the hot exhaust pipe 23 of the auxiliary heater 20 is also carried past a fuel supply line 7 of the engine 1, so as to heat the fuel located in that line as well. Thus in the second exemplary embodiment, by means of the exhaust gas stream from the auxiliary heater 20, both the aspirated air in the intake tube 2 and the fuel in the fuel supply line 7 are heated. As a result, even better mixture preparation can be attained for an ethanol-containing fuel. The auxiliary heater 20 in this exemplary embodiment is embodied as a water heater, in which a combustion chamber 22 of the auxiliary heater 20 is bathed by coolant 26 from the cooling system of the engine 1. As a result, in operation of the auxiliary heater 20, the engine 1 can be preheated as well, so that a cold start can be averted. In an inlet 27 for the coolant 26, a blocking valve 29 is provided, which can prevent the delivery of coolant. This assures that starting of the engine, a sufficient quantity of heat is delivered to the exhaust pipe 23 of the auxiliary heater 20, in order to heat the air in the intake tube 2 and the fuel with the ethanol component in the fuel supply line 7, for the sake of achieving problem-free starting of the engine even at temperatures below 0° C. The blocking valve 29 is preferably actuated by a regulating device, which does not open the blocking valve until after a successful start of the engine 1. Reference numeral 28 indicates an outflow outlet for the coolant of the heat transfer means between the auxiliary heater 20 and the cooling system. As can also be seen from FIG. 4, all the exhaust gas from the auxiliary heater 20 is delivered through the exhaust pipe 23 to an outlet 5 of the engine, so that an ensuing exhaust gas treatment of the entire exhaust gas stream of the vehicle, comprising the exhaust gas from the engine 1 and the exhaust gas from the auxiliary heater 20, is possible (arrow C).

A burner 21 of the auxiliary heater 20 may be ignited, for instance with a glow plug 30 or a spark plug 31.

The method according to the invention of switching on an auxiliary heater 20 before an engine 1, causing the hot exhaust gases from the auxiliary heater 20 to preheat the combustion air and/or the fuel for the engine 1, thus makes it possible to use a fuel that contains ethanol, or pure ethanol, without poor cold-starting properties, in particular when the engine is started at 0° C. or below. It is understood according to the invention that the auxiliary heater may also be used in the usual way as merely an auxiliary heater for the vehicle. It is also understood that the preheating of the combustion air and/or of the fuel of the engine can be done at temperatures above 0° C. as well, for avoiding cold starting of the engine 1.

Otherwise, this exemplary embodiment corresponds to the preceding exemplary embodiment, so that the description given for it may be referred to.

The foregoing relates to the preferred exemplary embodiments of the invention, it being understood that other variants and embodiments thereof are possible within the spirit and scope of the invention, the latter being defined by the appended claims.

The invention claimed is:

1. A vehicle having an internal combustion engine that is designed for combusting a fuel containing ethanol and an auxiliary heater, wherein
   an exhaust conduit of the auxiliary heater is disposed adjacent to an intake tube of the engine, in order to heat air located in the intake tube, and/or
   the exhaust conduit of the auxiliary heater is disposed adjacent to a fuel supply line of the engine, in order to heat fuel located in the fuel supply line, and/or
   a connection element is disposed between the exhaust conduit of the auxiliary heater and the intake tube, in order to deliver all or some of the exhaust gas from the auxiliary heater to the intake tube,
   wherein the vehicle further includes a temperature sensor which is disposed in the intake tube and a regulating device which regulates an injected fuel quantity for the engine as a function of the temperature in the intake tube.

2. The vehicle as defined by claim 1, wherein a valve device is disposed in the connection element between the exhaust conduit and the intake tube.

3. The vehicle as defined by claim 2, wherein the valve device is a slide.

4. The vehicle as defined by claim 1, wherein the exhaust conduit of the auxiliary heater discharges into an exhaust system of the engine.

5. The vehicle as defined by claim 2, wherein the exhaust conduit of the auxiliary heater discharges into an exhaust system of the engine.

6. The vehicle as defined by claim 1, wherein the exhaust conduit of the auxiliary heater extends beneath the intake tube of the engine.

7. The vehicle as defined by claim 2, wherein the exhaust conduit of the auxiliary heater extends beneath the intake tube of the engine.

8. The vehicle as defined by claim 1, wherein the auxiliary heater is embodied as a water heater, which communicates directly with a cooling system of the engine, and the cooling system of the engine includes a blocking element, in order upon engine starting to disconnect the cooling system from the auxiliary heater.

9. The vehicle as defined by claim 2, wherein the auxiliary heater is embodied as a water heater, which communicates directly with a cooling system of the engine, and the cooling system of the engine includes a blocking element, in order upon engine starting to disconnect the cooling system from the auxiliary heater.

10. The vehicle as defined by claim 1, further including at least one access sensor, which indicates to the regulating device an intent by a driver to enter the vehicle, on the basis of which intent the regulating device actuates the auxiliary heater, in order to preheat the combustion air and/or the fuel for the engine.

11. The vehicle as defined by claim 4, further including at least one access sensor, which indicates to the regulating device an intent by a driver to enter the vehicle, on the basis of which intent the regulating device actuates the auxiliary heater, in order to preheat the combustion air and/or the fuel for the engine.

12. The vehicle as defined by claim 6, further including at least one access sensor, which indicates to the regulating device an intent by a driver to enter the vehicle, on the basis of which intent the regulating device actuates the auxiliary heater, in order to preheat the combustion air and/or the fuel for the engine.

13. The vehicle as defined by claim 8, further including at least one access sensor, which indicates to the regulating device an intent by a driver to enter the vehicle, on the basis of which intent the regulating device actuates the auxiliary heater, in order to preheat the combustion air and/or the fuel for the engine.

14. The vehicle as defined by claim 1, wherein the exhaust conduit of the auxiliary heater is subdivided into a first exhaust pipe and a second exhaust pipe.

* * * * *